United States Patent

[11] 3,612,873

| | | |
|---|---|---|
| [72] | Inventor | Henry Ward Alter<br>Danville, Calif. |
| [21] | Appl. No. | 786,168 |
| [22] | Filed | Dec. 23, 1968 |
| [45] | Patented | Oct. 12, 1971 |
| [73] | Assignee | General Electric Company |

[54] NEUTRON FLUX RECORDER UTILIZING A CONTINUOUS WEB OF TRACK-REGISTRATION MATERIAL
16 Claims, 2 Drawing Figs.

[52] U.S. Cl. ................................................. 250/83.1,
250/83
[51] Int. Cl. ..................................................... G01t 3/00,
G01t 5/00
[50] Field of Search ........................................... 250/83 CD,
83.1

[56] References Cited
UNITED STATES PATENTS
3,457,408  7/1969  Alter ............................. 250/83.1

*Primary Examiner*—Archie R. Borchelt
*Attorneys*—Ivor J. James, Jr., Samuel E. Turner, John R. Duncan, Frank L. Neuhauser, Oscar B. Waddell and Melvin M. Goldenberg ABSTRACT: A neutron flux recorder is disclosed which is capable of continuously monitoring the neutron flux level of a nuclear reactor over an extended period of time. This recorder utilizes a continuous web of track-registration material which is slowly passed adjacent a slit containing a source material which emits charged particles such as fission fragments or alpha particles when irradiated with neutrons. The rate of charged particle emission by the source material is directly proportional to the neutron flux. The charged particles which strike the track-registration material form damage tracks therein. These tracks may be etched by treatment with a suitable etchant. The resulting etched tracks are visible and may be counted or otherwise measured. This produces a permanent record of the neutron flux level adjacent the recorder. These recorders can be made tamperproof and are capable of recording flux levels for periods on the order of a year.

PATENTED OCT 12 1971 3,612,873

INVENTOR:

HENRY WARD ALTER

BY: *John R. Duncan*

ATTORNEY

NEUTRON FLUX RECORDER UTILIZING A CONTINUOUS WEB OF TRACK-REGISTRATION MATERIAL

BACKGROUND OF THE INVENTION

In any nuclear arms control system, it is necessary to monitor nuclear reactors to continuously measure the quantities of fissionable materials consumed and the quantities of plutonium produced. The operating history of a nuclear reactor may be determined from a continuous record of the neutron flux levels around the reactor. Also, it is necessary to monitor shutdown reactors to detect illicit operation.

While it is possible to have an observer continuously present at all nuclear reactors to continuously monitor the reactor operating history, such a system is expensive and difficult to administer. This system would require a very large number of trustworthy inspectors. In addition to the expense in hiring and training these inspectors, many reactor operators would not wish to have an outside inspector present where he would observe proprietary matters and experiments unrelated to the arms control responsibilities.

As older reactors become obsolescent and are shutdown, it is desirable to have available a surveillance system which can produce a permanent record of any surreptitious operation of a shutdown reactor. Such a system should be capable of monitoring reactor operation in a way which provides a permanent record of the power level at which the reactor was operated, so that the approximate amount of plutonium produced can be determined.

Several systems for measuring neutron flux levels are available. However, these systems, using electronic detectors or photographic film recording means are generally complex and would require a full-time operator. Also, these systems are generally not tamperproof and could be compromised by the insertion of shielding or neutron absorbers.

Thus, there is a continuing need for an improved, tamperproof neutron flux level recording system which would be capable of monitoring reactor operating conditions for long periods without attention from an operator or requirement for external power or maintenance.

Recently, there has been developed a neutron dosimetry technique utilizing track-registration materials. In such a neutron emitted by the sheet pass a sheet of track-registration material is placed adjacent a sheet of material which emits fission fragments and/or alpha particles when irradiated with neutrons. The fission fragments or alpha particles emitted by the sheet pass through the track-registration sheet forming tracks of altered material along their trajectories. The track-registration sheet is then treated with an etchant which selectively dissolves away the altered material along the particle tracks. Individual tracks are then visible with a microscope. Also, large concentrations of tracks are visible to the naked eye as a "fogged" area on the film. Such neutron dosimeters are described in detail in U.S. Pat. No. 3,335,278.

It has now been found that such track-registration materials are especially suitable for use in the neutron flux recorder system of this invention.

SUMMARY OF THE INVENTION

It is, therefore, an object of this invention to provide a continuous neutron flux recorder of improved sensitivity and reliability.

Another object of this invention is to provide a neutron flux recorder which is relatively tamperproof.

Still another object of this invention is to provide a neutron flux recorder capable of unattended operation for long periods of time.

Yet another object of this invention is to provide a neutron flux recorder of inexpensive construction which produces a high quality permanent record of neutron flux levels over an extended time period.

The above objects, and others, are accomplished in accordance with this invention by providing a neutron flux recorder which includes a tape made up of a track-registration material with means to move the tape slowly past a quantity of a material which emits charged particles such as fission fragments or alpha particles when irradiated with neutrons. The system is preferably enclosed in a sealed, tamper-resistant container. The tape is driven at a very slow speed by means of a constant speed battery-operated drive means such as is used in battery-driven watches and clocks. Preferably, there is means included to place a visible mark on the tape at desired time intervals, such as each day. Preferably, a plurality of these neutron flux recorders are placed at different positions around an operating nuclear reactor. This redundancy compensates for flux-tipping maneuvers and makes difficult the insertion of neutron absorbers or other tampering devices.

An inspection team on an inspection trip to the reactor would remove the exposed tape and insert a new tape. The exposed tape may either be sent to a central processing point or may be easily developed immediately since the only developer required is the etching solution. A preliminary examination for the presence of tracks can be readily made by visual examination of the film for "fogging" if the track density exceeds about 10,000 tracks per square millimeter. A small portable microscope can be easily employed for lower flux levels or where more quantitative information is desired. The tape may be easily handled and shipped since the film itself is insensitive to exposure to light and gamma radiation since tracks are produced in it only by heavy, ionized particles. The film serves as a permanent legal record, since it could only be destroyed by exposure to exceptionally high temperatures.

While the above description primarily relates the neutron flux recorder of this invention to this especially interesting use in monitoring nuclear reactor operating characteristics, the device is also useful as an accidental criticality monitor, in civil defense installations and for military purposes.

BRIEF DESCRIPTION OF THE DRAWINGS

Details of the invention and of various preferred embodiments thereof will be further understood upon reference to the drawings, wherein.

DETAILED DESCRIPTION OF THE INVENTION

Figure 1:
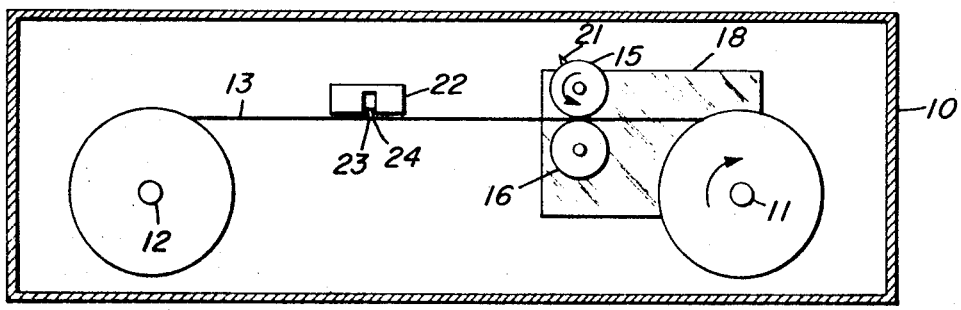
FIG. 1 shows a schematic representation of the neutron flux recorder of this invention if elevation.

Referring now to FIG. 1, there is seen a tamper-resistant container generally designated 10 which houses a takeup spool 11 and feed spool 12 for a tape of track-registration material 13. A pair of drive rollers 15 and 16 are in friction engagement with tape 13 to pull it at a uniform rate from feed spool 12. Drive means schematically indicated at 18 drives rollers 15 and 16 at a uniform rate. Drive means 18 also drives takeup spool 11 at a speed which takes up the tape leaving the drive rollers 15 and 16 without interfering with the operation of the drive rollers. A friction clutch such as schematically indicated at 20 in FIG. 2, may be included so that takeup spool 11 exerts a slight steady pressure on tape 13 assuring that the tape will wind uniformly and snugly on takeup spool 11.

A pin 21 projecting from drive roller 15 will perforate tape 13 once during each revolution of drive roller 15. Thus, by suitably adjusting the diameter and rotational speed of drive roller 15, a perforation will be produced in tape 13 at any desired time interval, such as once a day. A groove (not shown) in roller 16 is provided adjacent pin 21 to permit pin 21 to pass roller 16 as it perforates tape 13.

A plate 22 having a slot 23 filled with a charged particle source material 24 is provided as a source of charged particles for registration in tape 13.

Source material 24 may consist of any suitable material which emits alpha particles or fission fragments when irradiated with neutrons. Typical materials which emit fission fragments upon neutron irradiation include uranium-235 and plutonium-239. Typical materials which emit alpha particles upon neutron irradiation include lithium-6 and boron-10.

As is further pointed out below, the quantity of the fissionable material 24 present will determine the rate of damage track formation in tape 13 by a given neutron flux level. For example, once the maximum number of damage tracks per square centimeter of tape surface is determined, the maximum neutron flux expected is calculated and a quantity of fissionable material is placed in slot 24 which will produce the desired number of tracks at the neutron flux of the maximum anticipated level.

Any suitable material may be used in tape 13 which is capable of forming the track of altered material along the trajectory of a charged particle. Synthetic resins are preferred since tape 13 should be stable, flexible, thin and strong. Where fission fragments are to be recorded, polycarbonates have been found to have an optimum combination of physical characteristics and track forming capabilities. Where the track-forming charged particles are alpha particles, the cellulosics are preferred, such as cellulose nitrate and cellulose acetate, to obtain highest quality tracks. The tape may consist of a homogeneous web, or may consist of a layer of track-registration material on any suitable backing. For example, it may be desirable to use a relatively weak material which forms high quality tracks on a strong backing tape or web.

Figure 2:
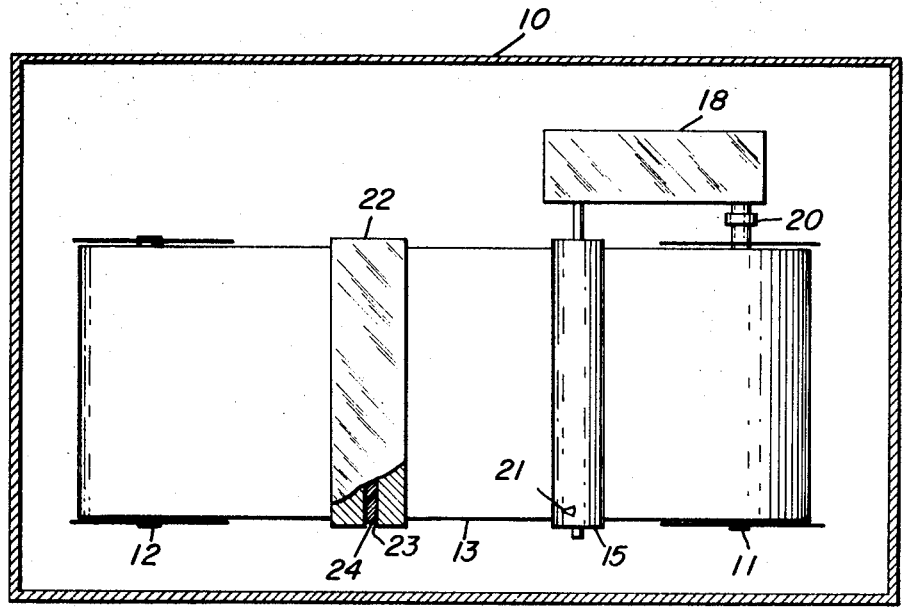
FIG. 2 shows a plan view of the neutron flux recorder shown in FIG. 1.

While tape 13 may be driven by any suitable means, battery operated clock-type motors are preferred since they are independent of outside power sources, are capable of operating for very long periods and are capable of driving the tape at a highly uniform rate. While a single drive means 18 is shown in FIGS. 1 and 2 for driving both drive rollers 15 and 16 and takeup spool 11, independent drive means may be provided, if desired. In the embodiment shown in FIGS. 1 and 2, the drive rate may be varied simply by changing the diameter of drive rollers 15 and 16.

While the tape-marking pin 21 mounted on drive roller 15 as shown in the figures is preferred, any other suitable tape-marking means may be used as desired. Marking pin 21 could, if desired, be independent of drive roller 15. For example, an independent cam drive could be provided for pin 21. Alternatively, an ink mark might be put on tape 13 by a cam-operated pen or stamp means. Although the system shown in the figures in which the fissionable material is placed in a slot formed in a plate is preferred since it is simple and reliable, the charged particle source material may be incorporated in any suitable arrangement. Where the source material 24 is placed in slot 23, it is immediately adjacent tape 13 but is out of contact therewith. If desired, to further protect the surface of the charged particle source material 24 a thin, preferably a few microns thick, layer of a protective plastic material may be applied. While it is preferred that source material 24 be placed on the side of tape 13 towards the neutron source, if desired the source material could be placed on the opposite side of tape 13 from the neutron source.

If desired, the layer of charged particle source material may be nonuniform across the tape width. For example, one side may have a larger quantity of the source material than the other side. Thus, low neutron flux levels would be most sensitively detected by the larger quantity of source material while very high flux levels would be measured more accurately by the smaller quantity of material. Also, if desired, a fission fragment-producing material may be used adjacent one edge of tape 13 while an alpha particle producing material may be used adjacent the other edge. Additional information on the neutron spectrum may be obtained by using materials which respond differently to fast and thermal neutrons.

Where the neutron flux monitor is to be left unattended for long periods, it should be enclosed in a tamper-resistant container 10. Such tamper-resistant containers are available. As long as the container, or at least the wall adjacent fissionable material 24, is made up of a material which does not have a high neutron absorption cross section, no windows or other openings need be provided in the container. For example, a zirconium alloy, stainless steel or glass container of reasonable thickness will permit the passage of sufficient neutrons to enable the recorder to operate effectively. Preferably, a door of sufficient size to permit the insertion and removal of the tape spools and to change batteries in the drive means must be provided. During use, this door may be sealed by any suitable lock, indicating seal or other tamper-resistant device. Alternatively, tamper-resistant container 10 may be closed in a manner, such as welding, requiring substantial destruction of the container to obtain access.

Preferably, several neutron flux recorders will be installed in each reactor to make difficult surreptitious operation of the reactor while shielding the recorders. An independent means demonstrating the uninterrupted, continuous operation of the neutron flux recorder can be obtained by putting a minute spot of a spontaneously fissioning nuclide, such as Californium-252, on plate 22 adjacent one edge of tape 13. A nanogram of this nuclide emits about a thousand fission fragments per second and provides a tamper-resistant, continuous source of fission fragments for track-registration on the tape. Any interruption in the movement of tape 13 over plate 22 would be recognizable by the resulting higher track density on the portion of the tape that has been located over this fission fragment source during the interruption. Thus, it would be very difficult to tamper with this neutron flux recorder without such tampering being readily apparent upon examination of the exposed tape.

After the recorder has operated unattended for the desired period, such as a year, the inspection team would open the container 10 and remove the exposed tape from takeup spool 11. This tape can be developed immediately or can be sent to a central processing point for development and evaluation. The tape is not sensitive to light or other radiation and cannot be damaged by anything other than high temperatures, approaching the softening temperature of the tape material. Thus, special handling of the tape is not necessary. The tape is developed by etching it in a suitable etchant solution, which enlarges the damage tracks to a size which becomes visible through a microscope. Also, large numbers of closely spaced tracks, about $10^4$ tracks per square millimeter, are visible to the naked eye as a "fogged" area on the tape.

Any suitable etchant may be used to enlarge the damage tracks to the desired diameter. The etchant may be an aqueous or nonaqueous solution of acidic or basic catalyst or redox agents, where suitable. Typical etchants include sodium hydroxide, potassium hydroxide, lithium hydroxide, chromic acid, potassium permanganate, ammonium hydroxide, potassium T-butoxide, tetra propyl ammonium hydroxide, and mixtures thereof. While any suitable solution concentration may be used, a concentrated solution is generally preferred for more rapid track enlargement. Similarly, while the etching solution may be used at any suitable temperature, it is generally preferable to heat (but not boil) the solution to increase the rate of track enlargement. Best results are obtained in general with an about 6-normal solution of sodium hydroxide at about 80° C., with stirring or agitation of the solution during treatment. The sheet may be treated with the etching solution for any suitable time period. Where the period is too short, the tracks may not have a sufficient diameter to be clearly visible, while too long a treating period may allow the solution to attack the body of the tape excessively. The optimum time will vary, of course, depending upon the sheet material, the etchant, desired pore size and the solution concentration and temperature. Typically, with a polycarbonate sheet, developed in 6-normal sodium hydroxide at about 60° C., about 20 minutes in the solution produces fully developed tracks having a diameter of about 0.3 microns. Quality of the etched tracks may be improved by pretreating the tape with ultraviolet light for a suitable period, as described in copending application Ser. No. 741,190, filed June 28, 1968.

Immediately after development, the exposed tape may be examined with the naked eye since periods of reactor operation will be shown as fogged areas on the tape. The fogging can be measured by photometric instrumentation. A more exact quantitative determination of reactor operating levels may be made by counting tracks in measured areas by means of a 200–400 power microscope. The developed tape may be used as a photographic negative since areas having large numbers of tracks tend to be sufficiently light diffusing and thus appear dark in a positive print made by conventional photographic techniques using the exposed tape as the negative. Also, where the tracks extend entirely through the tape, the holes may be made visible to the unaided eye by any of the techniques described in U.S. Pat. No. 3,373,683.

Preferably, a plurality of these neutron flux recorders are arranged in a suitable pattern within the shielding around the nuclear reactor to be monitored. This redundancy compensates for flux-tipping maneuvers and makes difficult the insertion of neutron absorbers between the reactor and the monitors or other tampering techniques.

The following example defines a specific preferred embodiment of the neutron flux recorder of this invention.

EXAMPLE

A flux recorder as shown in FIGS. 1 and 2 is assembled and placed within a container made up of stainless steel sheets having a thickness of about 1/16 inch. While the supporting framework for the various components is not shown in the Figures, this framework comprises conventional stainless steel supports and bearings for the various rotating shafts. A conventional battery-driven electric clock motor drive is installed to rotate the drive rollers and the takeup spool. A 5 meter long roll of 1.25 centimeter wide and 5 mil thick Lexan polycarbonate film available from the General Electric Company is installed on the feed spool. A shallow 0.05 centimeter wide slot in the plate is partially filled with a 20 micron thick layer of uranium dioxide in which substantially all of the uranium is the U–235 isotope. The drive roller is sized to drive the tape at a speed of about 1.25 centimeters per day at a rotational speed of 1 revolution per day. This speed will drive the tape across slot 23 at about one slot-width per hour. Thus, the pin makes one perforation in the tape each day. This neutron flux detector is placed adjacent a nuclear test reactor and allowed to remain while the reactor is operated at various power levels and through several shutdown periods. The recorder is then removed and the tape removed from the takeup spool. The tape is placed in a bath of 6-normal sodium hydroxide at a temperature of about 60° C. The solution is agitated for about 30 minutes, then the tape is removed, rinsed with water and dried. Visual inspection of the tape shows that "foggy" areas in the film are produced when the neutron flux at the recorder location is about $10^6$ thermal neutrons/cm.$^2$-sec. The tape is inspected through a 400 power microscope which shows that the foggy areas have approximately $10^4$ tracks per square millimeter or more. A quantitative measure of the flux levels below that necessary to produce the foggy-appearing areas can be obtained by counting the tracks per unit area on the tape. Once the recorder is calibrated for a particular location in a given reactor, it can serve to monitor widely varying power levels.

Although specific materials, components, proportions and conditions have been described in the above example, others may be used as listed above, where suitable, with similar results. In addition, other materials may be added to the fissionable layer, track-registration tape, etching bath, etc., to enhance or otherwise modify their properties.

Other modifications, applications and ramifications of the present invention will occur to those skilled in the art upon reading the present disclosure. These are intended to be included within the scope of this invention.

I claim:

1. A neutron flux recorder comprising:
   a. an elongated tape of track-registration material, said material being capable of forming tracks of altered material along the trajectories of charged particles in said material;
   b. adjacent said tape a quantity of a source material which emits charged particles upon neutron irradiation;
   c. means to move said tape past said source material at a uniform rate over long periods of time; and
   d. a tamper-resistant closed container permitting the passage of neutrons therethrough and surrounding said tape, source material and drive means.

2. The neutron flux recorder according to claim 1 further including a marking means positioned adjacent said tape, adapted to visibly mark said tape at selected time intervals.

3. The neutron flux recorder according to claim 1 wherein at least that portion of said tamper-resistant closed container adjacent said source material consists of a low neutron absorption cross section material.

4. The neutron flux recorder according to claim 1 wherein said source material extends adjacent substantially the entire width of said tape with the quantity adjacent one edge of said tape being greater than the quantity adjacent the other edge of said tape, whereby the number of tracks formed by a given neutron flux will vary across the width of said tape.

5. The neutron flux recorder according to claim 1 wherein said means to move said tape past said source material includes at least one drive roller in operative engagement with said tape; with said marking means mounted on said roller so as to engage and mark said tape once during each revolution of said roller.

6. The neutron flux recorder according to claim 1 further including a small amount of a spontaneously fissioning isotope adjacent said tape whereby a continuous uniform line of tracks in said tape is formed by charged particles from said spontaneously fissioning isotope and stoppages of said tape may be detected by locally higher track densities adjacent said spontaneously fissioning isotope.

7. The neutron flux recorder according to claim 1 wherein the quantity of source material is sufficient to produce at least about $10^4$ tracks per square millimeter at the maximum anticipated flux level to be recorded.

8. The neutron flux recorder according to claim 1 wherein said source material is selected from the group consisting of uranium-235, plutonium-239, and mixtures thereof; and said tape comprises a polycarbonate resin.

9. The neutron flux recorder according to claim 1 wherein said source material is selected from the group consisting of lithium-6, boron-10 and mixtures thereof; and said tape comprises a cellulosic resin.

10. The neutron flux recorder according to claim 1 wherein said means to move said tape past said source material includes a battery-driven uniform speed motor.

11. A method for monitoring the flux level of a nuclear reactor over a long period of time which comprises the steps of:
   a. providing adjacent the reactor to be monitored a quantity of a source material which emits charged particles upon irradiation with neutrons;
   b. slowly moving a tape of track-registration material past said source material in close proximity thereto, said track-registration material being capable of forming tracks of altered material along the trajectories of charged particles in said track-registration material; and
   c. treating said tape with an etching solution which preferentially attacks and dissolves said altered material, making said tracks visible, whereby the number of tracks at a given location along said tape is indicative of the power level of said reactor at the time said location was adjacent said source material.

12. The flux-monitoring method of claim 11 further including forming a visible mark on said tape at regular time intervals.

13. The method of flux monitoring according to claim 11 wherein said tape is moved by at least one drive roller in engagement therewith, and a pin mounted on said drive roller contacts said tape once during each revolution of said drive roller to form a visible mark on said tape.

14. The flux-monitoring method according to claim 11 further including providing a small amount of a spontaneously fissioning isotope adjacent said tape whereby charged particles emitted by said spontaneously fissioning isotope produce a continuous uniform line of tracks along said tape so that any stoppage of said tape will be indicated by a locally higher track density along said line.

15. The flux-monitoring method according to claim 11 wherein said source material is selected from the group consisting of uranium-235, plutonium-239 and mixtures thereof; and said tape comprises a polycarbonate resin.

16. The flux-monitoring method according to claim 11 wherein said source material comprises a material selected from the group consisting of lithium-6, boron-10, and mixtures thereof; and said tape comprises a cellulosic register.